(12) United States Patent
Botros

(10) Patent No.: US 10,150,894 B2
(45) Date of Patent: *Dec. 11, 2018

(54) POLYOLEFIN-BASED COMPOSITIONS HAVING POLYISOBUTYLENES, ADHESIVES, AND RELATED MULTI-LAYERED STRUCTURES THEREOF

(71) Applicant: EQUISTAR CHEMICALS, LP, Houston, TX (US)

(72) Inventor: Maged G. Botros, Liberty Township, OH (US)

(73) Assignee: Equistar Chemicals, LP, Houston, TX (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/406,430

(22) Filed: Jan. 13, 2017

(65) Prior Publication Data

US 2017/0158921 A1   Jun. 8, 2017

Related U.S. Application Data

(63) Continuation of application No. 14/861,395, filed on Sep. 22, 2015, now Pat. No. 9,593,269.

(51) Int. Cl.
| | |
|---|---|
| *C09J 123/06* | (2006.01) |
| *C08L 23/06* | (2006.01) |
| *B32B 7/12* | (2006.01) |
| *C09J 151/06* | (2006.01) |
| *C09J 5/00* | (2006.01) |
| *C09J 7/00* | (2018.01) |
| *C08L 23/22* | (2006.01) |
| *C08L 51/06* | (2006.01) |
| *C09J 7/28* | (2018.01) |

(52) U.S. Cl.
CPC ............. *C09J 123/06* (2013.01); *B32B 7/12* (2013.01); *C08L 23/06* (2013.01); *C08L 23/22* (2013.01); *C08L 51/06* (2013.01); *C09J 5/00* (2013.01); *C09J 7/00* (2013.01); *C09J 7/28* (2018.01); *C09J 151/06* (2013.01); *C08L 2201/08* (2013.01); *C08L 2205/02* (2013.01); *C08L 2205/025* (2013.01); *C08L 2205/03* (2013.01); *C08L 2205/035* (2013.01); *C08L 2205/06* (2013.01); *C08L 2207/062* (2013.01); *C09J 2201/122* (2013.01); *C09J 2400/163* (2013.01); *C09J 2423/00* (2013.01); *C09J 2423/04* (2013.01); *C09J 2451/00* (2013.01)

(58) Field of Classification Search
CPC ....... C09J 151/06; C09J 7/0292; C09J 119/00
See application file for complete search history.

(56) References Cited

U.S. PATENT DOCUMENTS

| | | | |
|---|---|---|---|
| 4,298,712 | A | 11/1981 | Machonis, Jr. et al. |
| 4,877,840 | A | 10/1989 | Chu |
| 6,482,281 | B1 | 11/2002 | Schmidt |
| 9,593,269 | B1 * | 3/2017 | Botros ............... C09J 7/0292 |
| 2007/0054142 | A1 | 3/2007 | Lee et al. |
| 2009/0169604 | A1 | 7/2009 | Iwao et al. |
| 2013/0261571 | A1 | 10/2013 | Prinz et al. |

FOREIGN PATENT DOCUMENTS

| | | |
|---|---|---|
| RU | 722213 A1 | 8/1996 |
| WO | WO-2012067741 A1 | 5/2012 |
| WO | WO-2012112303 A1 | 8/2012 |

OTHER PUBLICATIONS

International Search Report and Written Opinon dated Apr. 15, 2011 (Apr. 15, 2011) for Corresponding PCT/EP2011/052397.

* cited by examiner

*Primary Examiner* — Jeffrey C Mullis

(57) ABSTRACT

A polyolefin-based composition made from or containing (A) a first polymer composition made from or containing a polyolefin grafted with an unsaturated monomer, (B) a second polymer composition made from or containing a polyethylene, and (C) a third polymer composition made from or containing (i) a first polyisobutylene and (ii) a second polyisobutylene. The first polyisobutylene has a Viscosity Average Molecular Weight ($VAMW_1$), and the second polyisobutylene has a Viscosity Average Molecular Weight ($VAMW_2$), wherein $VAMW_1 \neq VAMW_2$. The polyolefin-based composition is useful as an adhesives or a tie-layer adhesive composition for multi-layered structures. In particular, the composition is useful as an adhesive to bind a metal layer to a dissimilar substrate.

16 Claims, No Drawings

POLYOLEFIN-BASED COMPOSITIONS HAVING POLYISOBUTYLENES, ADHESIVES, AND RELATED MULTI-LAYERED STRUCTURES THEREOF

CROSS-REFERENCE TO RELATED APPLICATIONS

This application is a Continuation Application that claims benefit to U.S. Non-Provisional Application No. 14/861,395, filed Sep. 22, 2015, the contents of which are incorporated herein by reference in its entirety.

FIELD OF THE INVENTION

In general, the present disclosure relates to the field of chemistry. More specifically, the present disclosure relates to polyolefin-based compositions useful as adhesives or tie-layer adhesive compositions for multi-layered structures. In particular, the compositions are useful as adhesives to bind a metal layer to a dissimilar substrate.

BACKGROUND OF THE INVENTION

Tie-layer adhesives are used to bond metal layers to dissimilar substrates in metal laminate applications and multi-layer, extrusion-coated structures. Tie-layer adhesives can be used in lamination, extrusion (or coextrusion), sheet extrusion, extrusion coating, injection molding, blow molding, melt thermoforming, and other processes.

Traditionally, materials in the areas of transportation, building and storage, and various other industries were fabricated from aluminum, steel, fiberglass-reinforced materials, or wood. Panels of those materials were used for making semi-trailers, truck bodies, and portable storage containers. However, an all-metal article of construction can be expensive and heavy. Also, fiberglass and wood products can gouge or splinter.

To provide cost, flexibility, and weight improvements, composite materials have been substituted for all-metal, fiberglass, and wood articles. Notably, composite systems offer the flexibility to combine the advantages of a variety of materials in their outer/facing layer and core/substrate layer, thereby permitting products which optimize price and performance. For example, outer/facing materials can include products such as acrylonitrile-butadiene-styrene, fiberglass-reinforced plastic, metals such as aluminum and stainless steel, and various other polymer products while the core/substrate materials can be made from metals such as aluminum, paper, polycarbonates, polyolefins, and polystyrene-based foam.

The construction industry provides other examples of using an adhesive to bind a metal layer to a dissimilar substrate. Examples include (a) nail-collation tape for loading nails into a nail gun, where the nails are adhered to the tape using an adhesive layer, (b) wires and cables wherein a conductive metal core is adhered to a polyolefinic layer, and (c) a multilayer pipe having a metal layer sandwiched between adjacent polyolefin-based layers wherein a tie-layer bonds the metal layer to the adjacent layers.

SUMMARY OF THE INVENTION

In general embodiments, the present disclosure provides a polyolefin-based composition made from or containing (A) a first polymer composition made from or containing a polyolefin grafted with an unsaturated monomer, (B) a second polymer composition made from or containing a polyethylene, and (C) a third polymer composition made from or containing (i) a first polyisobutylene and (ii) a second polyisobutylene. The first polyisobutylene has a Viscosity Average Molecular Weight ($VAMW_1$), and the second polyisobutylene has a Viscosity Average Molecular Weight ($VAMW_2$), wherein $VAMW_1 \neq VAMW_2$.

In some embodiments, the polyolefin-based composition is further made from or made to contain an additives composition.

In some embodiments, the present disclosure provides an adhesive made from or containing a polyolefin-based composition.

In some embodiments, the present disclosure provides a multi-layered structure made from or containing: (a) a tie-layer adhesive, wherein the tie-layer adhesive is made or contains a polyolefin-based composition; and (b) a metal layer.

DETAILED DESCRIPTION OF THE INVENTION

The present disclosure now will describe certain illustrative embodiments more fully hereinafter. However, the illustrative embodiments provided herein may be embodied in many different forms and should not be construed as limited to the particular embodiments set forth herein; rather, these embodiments are provided so that this disclosure will satisfy applicable legal requirements. As such, it will be apparent to those skilled in the art that the embodiments may incorporate changes and modifications without departing from the general scope of the appended claims. It is intended to include all such modifications and alterations in so far as they come within the scope of the appended claims or the equivalents thereof.

As used in this specification and the claims, the singular forms "a," "an," and "the" include plural referents unless the context clearly dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a convenient means for identifying discrete activities or ingredients and the recited lettering can be arranged in any sequence, unless expressly indicated.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Definitions

In the present description, the term "additives composition" refers to a composition made from or containing at least one additive.

In the present description, the terms "adhesive layer" and "tie layer" mean a layer or material placed on one or more substrates to promote the adhesion of that substrate to another layer. Preferably, adhesive layers are positioned between two layers of a multilayer structure to maintain the two layers in position relative to each other and prevent undesirable delamination.

In the present description, the term "α-olefin" or "alpha-olefin" means an olefin of formula $CH_2=CH-R$, wherein R is a linear or branched alkyl containing from 1 to 10 carbon atoms. The α-olefin can be selected, for example, from: propylene, 1-butene, 1-pentene, 1-hexene, 1-octene, 1-dodecene and the like.

In the present description, the term "first" refers to the order in which a particular species is presented and does not necessarily indicate that a "second" species will be presented. For example, "first polymer composition" refers to the first of at least one polymer composition. The term does not reflect priority, importance, or significance in any other way. Similar terms used that may be used herein include "second," "third," "fourth," etc.

In the present description, the term "grafted polyolefin" refers to a polyolefin grafted with an unsaturated monomer. The unsaturated monomer can be an unsaturated polar monomer. The unsaturated monomer can contain one or more oxygen atoms.

In the present description, the term "grafted polyolefin composition" refers to a composition made from or containing at least one grafted polyolefin.

In the present description, the term "homopolymer" as used herein is consistent with its ordinary meaning. To the extent that a homopolymer may contain one or more monomeric units, the incorporation of any additional monomeric units has essentially no effect on the polymer's primary, secondary or tertiary structure or no effect on the polymer's physical or chemical properties. In other words, there is no measureable difference between a polymer comprising 100 weight percent of a first monomeric unit, and a co-polymer that includes more than one monomeric units.

In the present description, the term "interpolymer" means a polymer prepared by the polymerization of at least two types of monomers or comonomers. It includes, but is not limited to, copolymers (which can refer to polymers prepared from two different types of monomers or comonomers, although it can be used interchangeably with "interpolymer" to refer to polymers made from three or more different types of monomers or comonomers), terpolymers (which can refer to polymers prepared from three different types of monomers or comonomers), tetrapolymers (which can refer to polymers prepared from four different types of monomers or comonomers), and the like.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer, of course, comprises units derived from the monomers, e.g., $-CH_2-CH_2-$, and not the monomer itself, e.g., $CH_2=CH_2$.

In the present description, "plastic film packaging" is of particular concern and discussed throughout this description. When referring to a multi-layer structure, the description may use a slash "/" to indicate that components to the left and right of the slash are in different layers and the relative position of components in layers may be so indicated by use of the slash to indicate layer boundaries.

In the present description, the term "polymer" means a macromolecular compound prepared by polymerizing monomers of the same or different type. The term "polymer" includes homopolymers, copolymers, terpolymers, interpolymers, and so on.

In the present description, the term "polymer composition" refers to a composition made from or containing at least one polymer.

In the present description, the term "polyolefin" is used herein broadly to include polymers such as polyethylene, ethylene-alpha olefin copolymers (EAO), polypropylene, polybutene, and ethylene copolymers having at least about 50 percent by weight of ethylene polymerized with a lesser amount of a comonomer such as vinyl acetate, and other polymeric resins within the "olefin" family classification.

Polyolefins may be made by a variety of processes including batch and continuous processes using single, staged or sequential reactors, slurry, solution, and fluidized bed processes and one or more catalysts including for example, heterogeneous and homogeneous systems and Ziegler, Phillips, metallocene, single-site, and constrained geometry catalysts to produce polymers having different combinations of properties. Such polymers may be highly branched or substantially linear and the branching, dispersity, and average molecular weight may vary depending upon the parameters and processes chosen for their manufacture in accordance with the teachings of the polymer arts.

In the present description, the term "room temperature" refers to a temperature around 25 degrees Celsius.

In the present description, the term "thermoplastic polymer" means a polymer that softens when exposed to heat and returns to its original condition when cooled to room temperature.

Testing

ASTM D 792 is entitled "Test Methods for Density and Specific Gravity (Relative Density) of Plastics by Displacement." The term "ASTM D 792" as used herein refers to the standard test method for determining the specific gravity (relative density) and density of solid plastics in forms such as sheets, rods, tubes, or molded items. The test method includes determining the mass of a specimen of the solid plastic in air, determining the apparent mass of the specimen upon immersion in a liquid, and calculating the specimen's specific gravity (relative density). This test method was approved on Jun. 15, 2008 and published July 2008, the contents of which are incorporated herein by reference in its entirety. For the referenced ASTM standards, visit the ASTM website, www.astm.org, or contact ASTM Customer Service at service@astm.org.

ASTM D 1238 is entitled "Test Method for Melt Flow Rates of Thermoplastics by Extrusion Plastometer." The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

Throughout the present description and claims, all the standard melt index values of polyethylene polymers are measured according to ASTM D 1238, using a piston load of 2.16 kg and at a temperature of 190 degrees Celsius. The High Load Melt Index (or HLMI) values are also measured according to ASTM D 1238, but using a piston load of 21.6 kg and at a temperature of 190 degrees Celsius.

Throughout the present description and claims, all the standard melt flow rate values of polypropylene polymers are measured according to ASTM D 1238, using a piston load of 2.16 kg and at a temperature of 230 degrees Celsius.

ASTM D 3167 is entitled "Standard Test Method for Floating Roller Peel Resistance of Adhesives." The term "ASTM D 3167" as used herein refers to a test method for determining the relative peel resistance of adhesive bonds between one rigid adherend and one flexible adherend when tested under specified conditions of preparation and testing. This test method was approved in 2010, the contents of which are incorporated herein by reference in its entirety. For the referenced ASTM standards, visit the ASTM website, www.astm.org, or contact ASTM Customer Service at service@astm.org.

Incorporated Unsaturated Monomer (Weight Percent): The amount of the unsaturated monomer incorporated into the grafted polyolefin can be measured by wet chemical methods (titration, etc.) or Fourier transform infrared spectroscopy (FTIR).

"Molecular Weight Distribution" or "($M_w/M_n$)" is measured by gel permeation chromatography. Molecular Weight Distribution (MWD) and the ratio $M_w/M_n$ are determined using a Waters 150-C ALC/Gel Permeation Chromatography (GPC) system equipped with a TSK column set (type GMHXL-HT) working at 135 degrees Celsius with 1,2-dichlorobenzene as solvent (ODCB) (stabilized with 0.1 vol. of 2,6-di-t-butyl p-cresole (BHT)) at flow rate of 1 ml/min. The sample is dissolved in ODCB by stirring continuously at a temperature of 140 degrees Celsius for 1 hour. The solution is filtered through a 0.45 µm Teflon membrane. The filtrate (concentration 0.08-1.2 g/l injection volume 300 µl) is subjected to GPC. Monodisperse fractions of polystyrene (provided by Polymer Laboratories) are used as standard.

In a general embodiment, the present disclosure provides a polyolefin-based composition made from or containing:
  (A) a first polymer composition made from or containing a polyolefin grafted with an unsaturated monomer;
  (B) a second polymer composition made from or containing a polyethylene; and
  (C) a third polymer composition made from or containing:
    (i) a first polyisobutylene, and
    (ii) a second polyisobutylene.
The first polyisobutylene has a Viscosity Average Molecular Weight ($VAMW_1$), and the second polyisobutylene has a Viscosity Average Molecular Weight ($VAMW_2$), wherein $VAMW_1$ $VAMW_2$.

First Polymer Composition—Polyolefin Grafted with an Unsaturated Monomer

The first polymer composition is made from or contains a polyolefin grafted with an unsaturated monomer.

In an embodiment, the first polymer composition is present in an amount from about 1 to about 30 weight percent, relative to the total weight of the polyolefin-based composition. In other embodiments, the first polymer composition is present in an amount from about 5 to about 15 weight percent. In some embodiments, the first polymer composition is present in 5, 6, 7, 8, 9, 10, 11, 12, 13, 14, or 15 weight percent, relative to the total weight of the polyolefin-based composition.

In some embodiments, the polyolefin grafted with an unsaturated monomer is prepared by reacting polyolefins with unsaturated monomers at elevated temperatures, with or without a free-radical initiator, under conditions effective to graft unsaturated monomer units onto the polyolefin backbone. The grafting reaction can occur under an inert gas, such as nitrogen.

Polyolefins can include high density polyethylenes (HDPE), medium density polyethylenes (MDPE), low density polyethylenes (LDPE), linear low density polyethylenes (LLDPE), polypropylenes, ethylene-propylene copolymers, impact-modified polypropylenes, and the like, and blends thereof.

Unsaturated monomers can be ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof. Other unsaturated monomers are described in U.S. Pat. No. 6,385,777 and U.S. Patent Application Publication No. 2007/0054142, the teachings of which are incorporated herein by reference.

The relative amounts of polyolefin and unsaturated monomer used will vary and depend on factors such as the nature of the polyolefin and the unsaturated monomer, the desired tie-layer properties, the reaction conditions, the available equipment, and other factors. The unsaturated monomer can be used in an amount within the range of about 0.1 to about 15 weight percent, based on the total weight of the grafted polyolefin. In other embodiments, the unsaturated monomer can be in the range of from about 0.5 to about 6 weight percent. In some embodiments, the range can be from about 1 to about 3 weight percent.

Grafting of the unsaturated monomer(s) to the polyolefin can be accomplished by heating a mixture of the unsaturated monomer(s) and the polyolefin. The grafted polyolefin can be prepared by melt blending the polyolefin with the unsaturated monomer in a shear-imparting extruder/reactor. Twin screw extruders such as those marketed by Coperion under the designations ZSK-53, ZSK-83, ZSK-90 and ZSK-92 are useful for performing the grafting step. A free-radical initiator such as an organic peroxide can be employed.

In some embodiments, the polyolefin grafted with an unsaturated monomer is a polyethylene grafted with maleic anhydride.

Second Polymer Composition—Polyethylene

The second polymer composition is made from or contains a polyethylene.

In an embodiment, the second polymer composition is present in an amount from about 50 to about 80 weight percent, relative to the total weight of the polyolefin-based composition. In other embodiments, the second polymer composition is present in an amount from about 60 to about 80 weight percent. In some embodiments, the second polymer composition is present in 69, 70, 71, 72, 73, 74, 75, 76, 77, or 78 weight percent, relative to the total weight of the polyolefin-based composition.

The polyethylene can be selected from the group consisting of ethylene homopolymers, copolymers of ethylene with at least one $C_3$ to $C_{10}$ α-olefin, the like, and mixtures thereof. In particular embodiments, they include high density polyethylenes (HDPE), medium density polyethylenes (MDPE), low density polyethylenes (LDPE), linear low density polyethylene (LLDPE), the like, and mixtures thereof. In some embodiments, the polyethylene is a HDPE.

In an embodiment, the polyethylene is a HDPE that has a density in the range of from about 0.940 to about 0.970 grams per cubic centimeter.

In some embodiments, the polyethylene can have a melt index in the range from about 0.01 to about 150 grams per 10 minutes. In other embodiments, the polyethylene can have a melt index from about 1.0 to about 20 grams per 10 minutes. In particular embodiments, the polyethylene will have a melt index in the range from about 10.0 to about 15 grams per 10 minutes. In some embodiments, the polyethylene will have a melt index of 10, 11, 12, 13, 14, or 15 grams per 10 minutes.

Third Polymer Composition—Polyisobutylenes

The third polymer composition is made from or contains (i) a first polyisobutylene and (ii) a second polyisobutylene. The first polyisobutylene has a Viscosity Average Molecular Weight ($VAMW_1$), and the second polyisobutylene has a Viscosity Average Molecular Weight ($VAMW_2$), wherein $VAMW_1 \neq VAMW_2$.

In an embodiment, the third polymer composition is present in an amount from about 10 to about 40 weight percent, relative to the total weight of the polyolefin-based composition. In other embodiments, the third polymer composition is present in an amount from about 10 to about 25 weight percent. In some embodiments, the third polymer composition is present in 15, 16, 17, 18, 19, or 20 weight percent, relative to the total weight of the polyolefin-based composition.

In a particular embodiment, the first polyisobutylene and the second polyisobutylene are present in a ratio from about 25:75 to about 75:25. In other embodiments the ratio is from about 40:60 to about 60:40. In some embodiments, the ratio is about 50:50.

Examples of the first and second polyisobutylene are commercially available from BASF under the trademark GLISSOPAL™ and under the trademark OPPANOL™ as well as from ExxonMobil under the trademark VISTANEX™.

Examples of GLISSOPAL™ polyisobutylene include:
GLISSOPAL™ 1000 having a VAMW of 1000 grams per mole
GLISSOPAL™ 1300 having a VAMW of 1300 grams per mole
GLISSOPAL™ 2300 having a VAMW of 2300 grams per mole.

Examples of OPPANOL™ polyisobutylene include:
OPPANOL™ B 10 SFN having a VAMW of $4.0*10^4$ grams per mole
OPPANOL™ B 11 SFN having a VAMW of $4.9*10^4$ grams per mole
OPPANOL™ B 12 SFN having a VAMW of $5.5*10^4$ grams per mole
OPPANOL™ B 13 SFN having a VAMW of $6.5*10^4$ grams per mole
OPPANOL™ B 14 SFN having a VAMW of $7.3*10^4$ grams per mole
OPPANOL™ B 15 SFN having a VAMW of $8.5*10^4$ grams per mole
OPPANOL™ B 30 SF having a VAMW of $2.0*10^5$ grams per mole
OPPANOL™ B 50 SF having a VAMW of $4.0*10^5$ grams per mole
OPPANOL™ B 80 having a VAMW of $8.0*10^5$ grams per mole
OPPANOL™ B 100 having a VAMW of $1.11*10^6$ grams per mole
OPPANOL™ B 150 having a VAMW of $2.6*10^6$ grams per mole
OPPANOL™ B 200 having a VAMW of $4.0*10^6$ grams per mole.

Examples of VISTANEX™ polyisobutylene include:
VISTANEX™ LM-MS having a VAMW of $4.5*10^4$ grams per mole
VISTANEX™ MM L-80 having a VAMW of $9.0*10^5$ grams per mole
VISTANEX™ MM L-100 having a VAMW of $1.25*10^6$ grams per mole
VISTANEX™ MM L-120 having a VAMW of $1.66*10^6$ grams per mole
VISTANEX™ MM L-140 having a VAMW of $2.12*10^6$ grams per mole.

In another particular embodiment, the first polyisobutylene has a $VAMW_1$ is from about $3*10^4$ to about $1*10^5$ grams per mole and the second polyisobutylene has a $VAMW_2$ is from about $2*10^5$ to about $5*10^6$ grams per mole. Examples of first polyisobutylene include OPPANOL™ B 10 SFN, OPPANOL™ B 11 SFN, OPPANOL™ B 12 SFN, OPPANOL™ B 13 SFN, OPPANOL™ B 14 SFN, OPPANOL™ B 15 SFN, and VISTANEX™ LM-MS. Examples of second polyisobutylene include OPPANOL™ B 30 SF, OPPANOL™ B 50 SF, OPPANOL™ B 80, OPPANOL™ B 100, OPPANOL™ B 150, OPPANOL™ B 200, VISTANEX™ MM L-80, VISTANEX™ MM L-100, VISTANEX™ MM L-120, and VISTANEX™ MM L-140. In some embodiments, the first polyisobutylene has a $VAMW_1$ is from about $6*10^4$ to about $1*10^5$ grams per mole and the second polyisobutylene has a $VAMW_2$ is from about $4*10^5$ to about $1*10^6$ grams per mole.

In another particular embodiment, the first polyisobutylene has a $VAMW_1$ and the second polyisobutylene has a $VAMW_2$ such that $(5*VAMW_1) \leq VAMW_2$.

In another particular embodiment, the first polyisobutylene has a $VAMW_1$ and the second polyisobutylene has a $VAMW_2$ such that $|VAMW_2 - VAMW_1|$ is from about $3*10^5$ to about $1*10^6$ grams per mole. In some embodiments, $|VAMW_2 - VAMW_1|$ is from about $5*10^5$ to about $9*10^5$ grams per mole.

Additives Composition

In an embodiment, the additives composition is present in an amount from about 0 to about 5 weight percent, relative to the total weight of the polyolefin-based composition. In other embodiments, the additives composition is present in an amount of 1, 2, 3, 4, or 5 weight percent, relative to the total weight of the polyolefin-based composition.

Exemplary additives include colorants, odorants, deodorants, plasticizers, impact modifiers, nucleating agents, lubricants, surfactants, wetting agents, flame retardants, ultraviolet light stabilizers, antioxidants, biocides, metal deactivating agents, thickening agents, heat stabilizers, defoaming agents, coupling agents, polymer alloy compatibilizing agent, blowing agents, emulsifiers, crosslinking agents, waxes, particulates, flow promoters, and other materials added to enhance processability or end-use properties of the polymeric components.

In some embodiments, the polyolefin-based composition is made from or contains
(A) from about 1 to about 30 weight percent of a first polymer composition made from or containing a polyolefin grafted with an unsaturated monomer, relative to the total weight of the polyolefin-based composition;

(B) from about 50 to about 80 weight percent of a second polymer composition made from or containing a polyethylene, relative to the total weight of the polyolefin-based composition;

(C) from about 10 to about 40 weight percent of a third polymer composition, relative to the total weight of the polyolefin-based composition, made from or containing:
  (i) a first polyisobutylene having a Viscosity Average Molecular Weight ($VAMW_1$), and
  (ii) a second polyisobutylene having a Viscosity Average Molecular Weight ($VAMW_2$)
    wherein $VAMW_1 \neq VAMW_2$; and (D) from about 0 to about 5 weight percent of an additives composition, relative to the total weight of the polyolefin-based composition.

In some embodiments, the present disclosure provides a polyolefin-based composition when adhered to a metal layer having a roller peel adhesion (ASTM D 3167) in the range of about 60 pounds per linear inch to about 70 pounds per linear inch, after 1-day aging at room temperature; alternatively in the range of about 40 pounds per linear inch to about 50 pounds per linear inch, after boiling 8 hours in water; alternatively in the range of about 35 pounds per linear inch to about 45 pounds per linear inch, after boiling 8 hours in water; alternatively in the range of about 45 pounds per linear inch to about 60 pounds per linear inch, after soaking for 21 days in water at room temperature; and alternatively in the range of about 50 pounds per linear inch to about 70 pounds per linear inch, after soaking for 21 days in water at room temperature. The metal layer may be formed from aluminum, steel, stainless steel, copper, combinations thereof, and the like metals. The metal layers may be treated with an epoxy coating or may be chromium treated.

In some embodiments, the present disclosure provides a polyolefin-based composition when adhered to an epoxy-coated aluminum having a roller peel adhesion (ASTM D 3167) in the range of about 60 pounds per linear inch to about 70 pounds per linear inch, after 1-day aging at room temperature.

In some embodiments, the present disclosure provides a polyolefin-based composition when adhered to an epoxy-coated aluminum having a roller peel adhesion (ASTM D 3167) in the range of about 35 pounds per linear inch to about 45 pounds per linear inch, after boiling 8 hours in water.

In some embodiments, the present disclosure provides a polyolefin-based composition when adhered to an epoxy-coated aluminum having a roller peel adhesion (ASTM D 3167) in the range of about 45 pounds per linear inch to about 60 pounds per linear inch, after soaking for 21 days in water at room temperature.

In some embodiments, the present disclosure provides a polyolefin-based composition when adhered to chromium-treated aluminum having a roller peel adhesion (ASTM D3167) in the range of about 40 pounds per linear inch to about 50 pounds per linear inch, after boiling 8 hours in water.

In some embodiments, the present disclosure provides a polyolefin-based composition when adhered to chromium-treated aluminum having a roller peel adhesion (ASTM D 3167) in the range of about 50 pounds per linear inch to about 70 pounds per linear inch, after soaking for 21 days in water at room temperature.

In some embodiments, the present disclosure provides an adhesive made from or containing a polyolefin-based composition.

The adhesive composition can take any form, e.g., hot-melt, pressure sensitive, solvent-based, etc. Tie layer and laminate adhesive compositions are examples.

The adhesives are useful as a tie-layer for making multi-layer structures. The multi-layer structures have at least two layers in addition to the adhesive layer, which bonds the other layers together. Tie-layer adhesives can be used in structures having five, seven, nine, or more layers. The multi-layer structure can be made by many methods or processes, including by coextrusion, coating, and other laminating processes.

In some embodiments, the present disclosure provides multi-layered strucures made from or containing (a) a tie-layer adhesive, wherein the tie-layer adhesive is made or contains a polyolefin-based composition, and (b) a metal layer. The metal layer may be formed from aluminum, steel, stainless steel, copper, combinations thereof, and the like metals. The metal layers may be treated with an epoxy coating or may be chromium treated.

In some embodiments, a multi-layered structure can be made by using a tie-layer adhesive to bind a metal layer to a dissimilar substrate and optionally a dissimilar metal layer. The metal layer(s) may independently selected from aluminum, steel, stainless steel, copper, combinations thereof, and the like metals. The metal layers may be treated with an epoxy coating or may be chromium treated. In some embodimens, the multi-layered structure may have the following structure: metal/tie/polyolefin/tie/metal.

In some embodiments, the present disclosure provides multi-layered strucutres that may be used in applications including at least buidling panels, automotive panels including panels used in trucks and cars, aircraft panels, marine panels, wire and cables, and nail collation.

EXAMPLES

The following examples are included to demonstrate illustrative embodiments of the appended claims. It should be appreciated by those of skill in the art that the techniques disclosed in the examples which follow represent techniques discovered by the inventor to function well in the practice of the illustrative embodiments provided herein, and thus can be considered to constitute exemplary modes for its practice. However, those of skill in the art should, in light of the present disclosure, appreciate that many changes can be made in the specific embodiments which are disclosed and still obtain a like or similar result without departing from the spirit and scope of the appended claims.

For the examples provided herein, various compounds were formulated to prepare test specimen. The materials were admixed in the weight percents shown in Table 1.

The grafted polyolefin was prepared by feeding a fractional melt index, high density polyethylene (High Load Melt Index: 3 grams per 10 minutes; Density: 0.957 grams per cubic centimeter; $M_w/M_n$:10.2; $M_n$:23,000; $M_w$:235,000; $M_z$:1.5*$10^6$; and $M_{z+1}$:3.9*$10^6$) and maleic anhydride (1.9 weight percent in grafted HDPE, based on total charged reactants) to a COPERION™ ZSK-92 twin-screw extruder having zones heated at temperatures ranging from 88 degrees Celsius to 252 degrees Celsius and operated at shear rates within the range of 435 rpm and under nitrogen. The extruder had eleven heating zones, which were heated as followed: zone 1 (88 degrees Celsius); zones 2 and 3 (204 degrees Celsius); zones 4-6 (252 degrees Celsius); zones 7-9 (149 degrees Celsius); and zones 10 and 11 (93 degrees Celsius).

Polyethylene: Equistar Chemical LP's ALATHON™ H5112 high density polyethylene (Melt Index: 12.0 grams per 10 minutes; Density:0.951 grams per cubic centimeter; Polydispersity Index: 6.2).

Polyisobutylene: BASF's OPPANOL™ B15 polyisobutylene (Viscosity Average Molecular Weight (VAMW):85,000 grams per mole; BASF's OPPANOL™ B80 polyisobutylene (VAMW:800,000 grams per mole).

Addditives: Ciba's IRGANOX™ 1010 phenolic primary antioxidant; Ciba's IRGAFOS™ 168 trisarylphosphite processing stabilizer.

Compound Preparation

To prepare the adhesives of the comparative examples and the examples of an embodiment, (a) the grafted polyolefin, (b) the polyethylene, (c) the polyisobutylene composition, and (d) the additives were first melt blended in a ZSK-18 extruder, and then extruded in a Killion KL-100 extruder having a temperature profile of 145 degrees Celsius, 155 degrees Celsius, 160 degrees Celsius, and 170 degrees Celsius.

Sample Preparation

The test specimen were produced using (a) 15.24 cm×15.24 cm panels of a metal, (b) the tie-layer adhesives of the comparative examples (C. Exs. 1-4) and the inventive examples (Exs. 5 and 6), and (c) a HDPE, in a structure corresponding to Metal/Tie/HDPE/Tie/Metal.

The metal was a 22-mil (a) epoxy-coated aluminum layer or (b) chromium-treated aluminum layer.

The tie-layers were 5-mil cast adhesive films.

The HDPE was a 270-mil layer of a commercially available 0.96 high density polyethylene.

The film panel structure was compression molded at 204 degrees Celsius and 2.72 atm for 40 seconds, and then cooled to room temperature at 2.72 atm. A roller peel adhesion test was conducted according to ASTM D 3167. Adhesion to metal was measured in pounds per linear inch (PLI) after 1 day aging at room temperature, after boiling laminated samples in water for 8 hours and after soaking samples in water at room temperature for 21 days.

TABLE 1

| Component/Test | C. Ex. 1 | C. Ex. 2 | C. Ex. 3 | C. Ex. 4 | Ex. 5 | Ex. 6 |
|---|---|---|---|---|---|---|
| Grafted Polyolefin | 8 | 10 | 8 | 8 | 10 | 10 |
| H5112 | 76.87 | 69.87 | 76.87 | 71.87 | 74.87 | 69.87 |
| B15 | 15 | 20 | — | — | 7.5 | 10 |
| B80 | — | — | 15 | 20 | 7.5 | 10 |
| 1010 | 0.065 | 0.065 | 0.065 | 0.065 | 0.065 | 0.065 |
| 168 | 0.065 | 0.065 | 0.065 | 0.065 | 0.065 | 0.065 |
| Total | 100 | 100 | 100 | 100 | 100 | 100 |
| Adhesion to Epoxy-coated Aluminum (PLI) | | | | | | |
| 1 Day | 20.3 | 21.9 | 22.6 | 34.4 | 61.7 | 64.7 |
| 8-Hour Boil | 20.1 | 22.1 | 29.3 | 37.1 | 38.3 | 42.3 |
| 21-day Water | 16.3 | 28.9 | 27.1 | 41.1 | 50.6 | 55.1 |
| Adhesion to Chromium-treated Aluminum (PLI) | | | | | | |
| 8-Hour Boil | 20.4 | 21.0 | 31.4 | 41.4 | — | 44.9 |
| 21-day Water | 24.2 | 23.2 | 45.0 | 42.3 | — | 61.6 |

* All weight percentages are based upon the total weight of the final composition.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A polyolefin-based composition comprising:
   (A) about 1 to about 30 wt. %, relative to the total weight of the polyolefin-based composition, of a first polymer composition comprising: a polyolefin grafted with an unsaturated monomer;
   (B) about 50 to about 80 wt. %, relative to the total weight of the polyolefin-based composition, of a second polymer composition comprising a high density polyethylene; and
   (C) about 10 to about 40 wt. %, relative to the total weight of the polyolefin-based composition, of a third polymer composition comprising:
      (i) a first polyisobutylene having a Viscosity Average Molecular Weight (VAMW$_1$); and
      (ii) a second polyisobutylene having a Viscosity Average Molecular Weight (VAMW$_2$)
      wherein VAMW$_2 \geq (5 \times$VAMW$_1)$.

2. The polyolefin-based composition of claim 1, further comprising an additives composition having one or more additives.

3. The polyolefin-based composition of claim 1, wherein the polyolefin grafted with an unsaturated monomer is a polyethylene grafted with maleic anhydride.

4. The polyolefin-based composition of claim 1, wherein the polyethylene is a high density polyethylene.

5. The polyolefin-based composition of claim 1, wherein the first polyisobutylene and the second polyisobutylene are present in an about 50:50 ratio.

6. The polyolefin-based composition of claim 1, wherein
   (A) VAMW$_1$ is from about $3*10^4$ to about $1*10^5$ grams per mole; and
   (B) VAMW$_2$ is from about $2*10^5$ to about $5*10^6$ grams per mole.

7. The polyolefin-based composition of claim 1, wherein |VAMW$_2$–VAMW$_1$| is from about $3*10^5$ to about $1*10^6$ grams per mole.

8. The polyolefin-based composition of claim 1 further comprising:
   (A) from about 1 to about 30 weight percent of the first polymer composition, relative to the total weight of the polyolefin-based composition;
   (B) from about 50 to about 80 weight percent of the second polymer composition, relative to the total weight of the polyolefin-based composition;
   (C) from about 10 to about 25 weight percent of the third polymer composition, relative to the total weight of the polyolefin-based composition; and
   (D) from 0 to about 5 weight percent of an additives composition, relative to the total weight of the polyolefin-based composition.

9. The polyolefin-based composition of claim 8, wherein when adhered to a metal layer, the polyolefin-based composition has a roller peel adhesion (ASTM D3167) in the range of about 60 pounds per linear inch to about 70 pounds per linear inch, after 1-day aging at room temperature.

10. The polyolefin-based composition of claim 9, wherein the metal layer is an epoxy-coated aluminum.

11. The polyolefin-based composition of claim 8, wherein when adhered to a metal layer, the polyolefin-based composition has a roller peel adhesion (ASTM D3167) in the range of about 35 pounds per linear inch to about 45 pounds per linear inch, after boiling 8 hours in water.

12. The polyolefin-based composition of claim 11, wherein the metal layer is an epoxy-coated aluminum.

13. The polyolefin-based composition of claim 8, wherein when adhered to a metal layer, the polyolefin-based composition has a roller peel adhesion (ASTM D3167) in the range of about 40 pounds per linear inch to about 50 pounds per linear inch, after boiling 8 hours in water.

14. The polyolefin-based composition of claim 13, wherein the metal layer is a chromium-treated aluminum.

15. An adhesive comprising:
(A) a polyolefin-based composition comprising:
  (i) from about 1 to about 30 weight percent of a first polymer composition comprising: a polyolefin grafted with an unsaturated monomer, relative to the total weight of the polyolefin-based composition;
  (ii) from about 50 to about 80 weight percent of a second polymer composition comprising: a polyethylene, relative to the total weight of the polyolefin-based composition;
  (iii) from about 10 to about 40 weight percent of a third polymer composition, relative to the total weight of the polyolefin-based composition, comprising:
    (a) a first polyisobutylene having a Viscosity Average Molecular Weight ($VAMW_1$); and
    (b) a second polyisobutylene having a Viscosity Average Molecular Weight ($VAMW_2$) wherein $VAMW_2 \geq (5 \times VAMW_1)$; and
  (iv) from 0 to about 5 weight percent of an additives composition, relative to the total weight of the polyolefin-based composition.

16. A multi-layered structure comprising:
(A) a tie-layer adhesive comprising:
  (i) a polyolefin-based composition comprising:
    (a) from about 1 to about 30 weight percent of a first polymer composition comprising: a polyolefin grafted with an unsaturated monomer, relative to the total weight of the polyolefin-based composition;
    (b) from about 50 to about 80 weight percent of a second polymer composition comprising: a polyethylene, relative to the total weight of the polyolefin-based composition;
    (c) from about 10 to about 40 weight percent of a third polymer composition, relative to the total weight of the polyolefin-based composition, comprising:
      (1) a first polyisobutylene having a Viscosity Average Molecular Weight ($VAMW_1$); and
      (2) a second polyisobutylene having a Viscosity Average Molecular Weight ($VAMW_2$) wherein $VAMW_2 \geq (5 \times VAMW_1)$; and
    (d) from 0 to about 5 weight percent of an additives composition, relative to the total weight of the polyolefin-based composition; and
(B) a metal layer.

* * * * *